United States Patent
Kozlow

(10) Patent No.: US 9,495,878 B2
(45) Date of Patent: Nov. 15, 2016

(54) METHOD AND DEVICE FOR AUTOMATICALLY MANAGING A FLIGHT PATH CHANGE ON AN AIRCRAFT, IN PARTICULAR FOR A LOW-LEVEL FLIGHT

(71) Applicant: AIRBUS OPERATIONS (S.A.S.), Toulouse (FR)

(72) Inventor: Boris Kozlow, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 310 days.

(21) Appl. No.: 14/473,548

(22) Filed: Aug. 29, 2014

(65) Prior Publication Data

US 2015/0254989 A1 Sep. 10, 2015

(30) Foreign Application Priority Data

Sep. 10, 2013 (FR) ...................... 13 58665

(51) Int. Cl.

| | | |
|---|---|---|
| G08G 5/00 | (2006.01) | |
| G01C 21/20 | (2006.01) | |
| G05D 1/10 | (2006.01) | |
| G06F 11/00 | (2006.01) | |

(52) U.S. Cl.
CPC ............ *G08G 5/0047* (2013.01); *G01C 21/20* (2013.01); *G05D 1/101* (2013.01); *G06F 11/00* (2013.01); *G08G 5/0039* (2013.01)

(58) Field of Classification Search
CPC .. G08G 5/0047; G08G 5/0039; G01C 21/20; G05D 1/101
See application file for complete search history.

(56) References Cited

U.S. PATENT DOCUMENTS

| | | | |
|---|---|---|---|
| 6,163,744 A * | 12/2000 | Onken ................... | G01C 23/00 340/979 |
| 7,089,091 B2 | 8/2006 | Artini et al. | |
| 7,349,773 B2 | 3/2008 | Berard | |
| 7,783,394 B2 | 8/2010 | Artini | |
| 7,949,438 B2 | 5/2011 | Artini et al. | |
| 2005/0261808 A1* | 11/2005 | Artini ................... | G01C 23/00 701/3 |

(Continued)

FOREIGN PATENT DOCUMENTS

| | | |
|---|---|---|
| EP | 1 598 641 | 11/2005 |
| EP | 1 600 733 | 11/2005 |

(Continued)

OTHER PUBLICATIONS

Calculateur_translation.pdf. Obtained from http://dictionary.reverso.net/french-english/calculateur on Jul. 6, 2016.*

(Continued)

*Primary Examiner* — John R Olszewski
*Assistant Examiner* — Jeffrey Boomer
(74) *Attorney, Agent, or Firm* — Jenkin, Wilson, Taylor & Hunt, P.A.

(57) ABSTRACT

A method and device are disclosed for automatically managing a flight path change on an aircraft, in particular for a low-level flight. The method determines a first deviation between the current position and a current path of the aircraft and a second deviation between this current position and a new path of the aircraft and changes the flight path by replacing the current path by the new path, if at least the absolute value of the difference between this first deviation and this second deviation is less than or equal to a maximal allowed distance during at least a predefined time period.

13 Claims, 2 Drawing Sheets

(56) References Cited

U.S. PATENT DOCUMENTS

| | | | | |
|---|---|---|---|---|
| 2008/0172148 A1* | 7/2008 | Isorce | G05D 1/0646 | 701/9 |
| 2009/0024261 A1* | 1/2009 | Rouquette | G05D 1/0676 | 701/16 |
| 2010/0332111 A1* | 12/2010 | Closse | G08G 5/025 | 701/120 |
| 2011/0077858 A1* | 3/2011 | Coulmeau | G05D 1/101 | 701/465 |
| 2011/0253841 A1* | 10/2011 | Kozlow | B64D 15/20 | 244/134 F |
| 2012/0253562 A1* | 10/2012 | Wachenheim | G08G 5/0034 | 701/4 |
| 2013/0060466 A1* | 3/2013 | Gurusamy | G01C 23/005 | 701/465 |
| 2013/0226373 A1* | 8/2013 | Bollapragada | G08G 5/0039 | 701/3 |
| 2014/0136027 A1* | 5/2014 | Mere | B64C 19/00 | 701/3 |
| 2014/0343763 A1* | 11/2014 | Koebel | B64D 45/00 | 701/14 |
| 2014/0365045 A1* | 12/2014 | Canale | G01C 23/005 | 701/17 |
| 2015/0112583 A1* | 4/2015 | Koebel | G08G 5/0039 | 701/400 |
| 2015/0204675 A1* | 7/2015 | Albert | G01C 21/20 | 701/400 |
| 2015/0262490 A1* | 9/2015 | Deker | G08G 5/0052 | 701/3 |
| 2015/0310746 A1* | 10/2015 | Albert | G08G 5/0047 | 701/3 |
| 2015/0314854 A1* | 11/2015 | Albert | G08G 5/0039 | 701/3 |
| 2016/0027309 A1* | 1/2016 | Berrajaa | G05D 1/0202 | 701/527 |

FOREIGN PATENT DOCUMENTS

| | | |
|---|---|---|
| EP | 2 881 533 | 8/2006 |
| EP | 2 881 534 | 8/2006 |

OTHER PUBLICATIONS

French Search Report for Application No. 1358665 dated Jun. 16, 2014.

* cited by examiner

METHOD AND DEVICE FOR AUTOMATICALLY MANAGING A FLIGHT PATH CHANGE ON AN AIRCRAFT, IN PARTICULAR FOR A LOW-LEVEL FLIGHT

TECHNICAL FIELD

The present disclosure relates to a method and to a device for automatically managing a flight path change on an aircraft, in particular for a low-altitude flight.

BACKGROUND

During the flight of an aircraft, in particular during a low-altitude flight taking place automatically (by an autopilot device and/or a flight director), onboard systems can be made to modify the path followed by the aircraft (laterally and vertically) at the request of a pilot of the aircraft.

In order to do this, the pilot modifies the flight plan using a flight management system of the aircraft. The flight management system calculates a new (lateral and/or vertical) path corresponding to the modified flight plan. The calculation of this new path may last for several seconds. During this time period, the aircraft has to continue to fly on the current path, before the change can potentially be made.

SUMMARY

The object of the present disclosure is that of securing the transition between the current flight path and the new flight path. It relates to a method for automatically managing a flight path change on an aircraft, in particular during a low-altitude flight, a flight path comprising at least one of the following paths: a lateral path and a vertical path.

According to the disclosure, the method comprises at least one step a), which is implemented automatically, and comprising, during a flight of the aircraft along a flight path referred to as a current path, calculating a new flight path referred to as an auxiliary path is remarkable in that it comprises additional steps, which are implemented automatically, and comprising:
  b) carrying out a path comparison, by repeatedly implementing the following successive sub-steps over a predetermined time period, comprising:
    b1) determining the current position of the aircraft;
    b2) determining a first deviation corresponding to a deviation of the current position of the aircraft from the current path;
    b3) determining a second deviation corresponding to a deviation of the current position of the aircraft from the auxiliary path;
    b4) calculating the difference between the first and second deviations; and
    b5) comparing the absolute value of this difference with a predetermined maximum allowed distance, a first condition being considered to be met when the absolute value is less than or equal to the maximum allowed distance; and
  c) making a flight path change if at least the first condition is considered to be met repeatedly over the entire predetermined time period, a flight path change comprising in replacing the current path with the auxiliary path in a manner such as to make the aircraft fly following the auxiliary path from the change onwards.

Thus, owing to the disclosure, paths are automatically compared during a predetermined time period in order to verify that the differences between the two paths (current and auxiliary) remain limited, before authorising a path change. This comparison between the two paths is not carried out from point to point, but by comparing the deviations between the current position of the aircraft and these two paths respectively, thereby allowing a path change to be sanctioned even if the two paths are not completely identical in the region of a common portion.

In a particular embodiment, in addition:
  in step b), the absolute value of the first deviation is compared with a predetermined threshold, a second condition being considered to be met when the absolute value of the first deviation is less than or equal to the predetermined threshold; and
  in step c), a flight path change is made if, in addition to the first condition, the second condition is also considered to be met repeatedly over the entire predetermined time period.

Moreover, advantageously, a deviation of the current position of the aircraft from a flight path corresponds to the distance between this current position and an auxiliary point on the flight path, this auxiliary point corresponding to the orthogonal projection of the current position on the flight path.

In addition, advantageously, step b) determines and uses deviations corresponding to:
  lateral deviations from a lateral path of a flight path; and/or
  vertical deviations from a vertical path of a flight path.

The present disclosure also relates to a device for automatically managing a flight path change on an aircraft, in particular for a low-altitude flight, the device comprising a flight management calculator configured to automatically calculate, during a flight of the aircraft along a flight path referred to as a current flight path, a new flight path referred to as an auxiliary flight path, and a position calculator configured to automatically determine the current position of the aircraft.

According to the disclosure, the device further comprises:
  a central unit configured to carry out a path comparison, the central unit comprising calculation elements to automatically carry out the following operations:
    determining a first deviation corresponding to a deviation of the current position of the aircraft from the current path;
    determining a second deviation corresponding to a deviation of the current position of the aircraft from the auxiliary path;
    calculating the difference between the first and second deviations; and
    comparing the absolute value of this difference with a predetermined maximum allowed distance, a first condition being considered to be met when the absolute value is less than or equal to the maximum allowed distance; and
  a path change unit configured to automatically make a flight path change if at least the first condition is considered to be met repeatedly over a predetermined time period, a flight path change comprising in replacing the current path with the auxiliary path in a manner such as to make the aircraft fly following the auxiliary path from the change onwards.

In a particular embodiment, the central unit is part of a guidance calculator of the aircraft.

The present disclosure also relates to a system for guiding an aircraft, which comprises a position calculator, a flight management calculator and a guidance calculator, the guidance system further comprising a device for automatically managing a flight path change such as that mentioned above.

The present disclosure further relates to an aircraft, in particular a transport aircraft, that is provided with such a device and/or such a guidance system.

BRIEF DESCRIPTION OF THE DRAWINGS

The accompanying drawings will give a better understanding of how the disclosure can be implemented. In these drawings, identical reference numerals designate similar elements.

DETAILED DESCRIPTION

Figure 1:
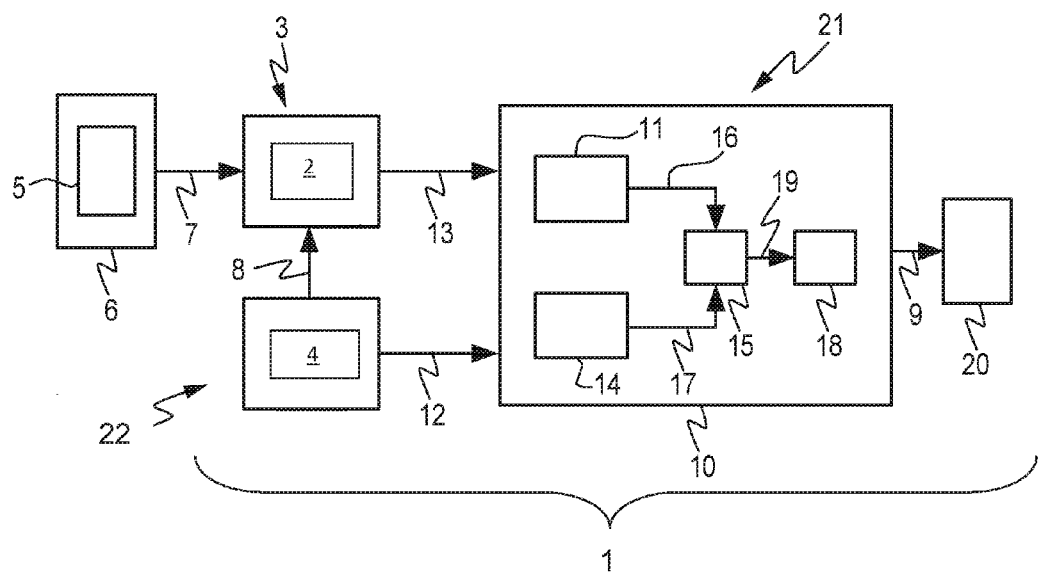
FIG. 1 shows a block diagram of a device which illustrates an embodiment of the disclosure.

The device 1 which is shown schematically in FIG. 1 and allows the disclosure to be illustrated is a device for automatically managing a flight path change of an aircraft AC, in particular of a military transport aeroplane, in particular during a low-altitude flight, which change is made automatically.

This automatic management device which is on board the aircraft AC comprises:
  a flight management calculator 2 which is part of a flight management system 3, the flight management calculator 2 being configured to automatically calculate, in a conventional manner, flight paths of the aircraft AC; and
  a position calculator 4 which is configured to automatically determine, in a conventional manner, the current position PC of the aircraft AC, for example by a GPS receiver connected to a satellite positioning system of the GPS (global positioning system) type.

During a flight, which is in particular at low altitude and automatic (with an auto-pilot device and/or a flight director of the aircraft AC, which are in use), the flight path T1 (FIG. 2) followed by the aircraft AC can be modified (laterally and vertically) at the request of a pilot of the aircraft AC.

In order to do this, the pilot modifies the flight plan using an appropriate input unit 5 allowing data relating to the new flight plan under consideration to be entered. These data are provided via a connection 7 to the flight management calculator 2. This input unit 5 is part of a set 6 of information sources allowing information to be provided, either automatically or via an input from a pilot, to the flight management calculator 2.

The flight management calculator 2 calculates, in a conventional manner, the (lateral and/or vertical) path T2 corresponding to the modified flight plan from the position of the aircraft AC at the moment at which the pilot requests the calculation. This position can be received from the position calculator 4 by a connection 8.

Figure 2:
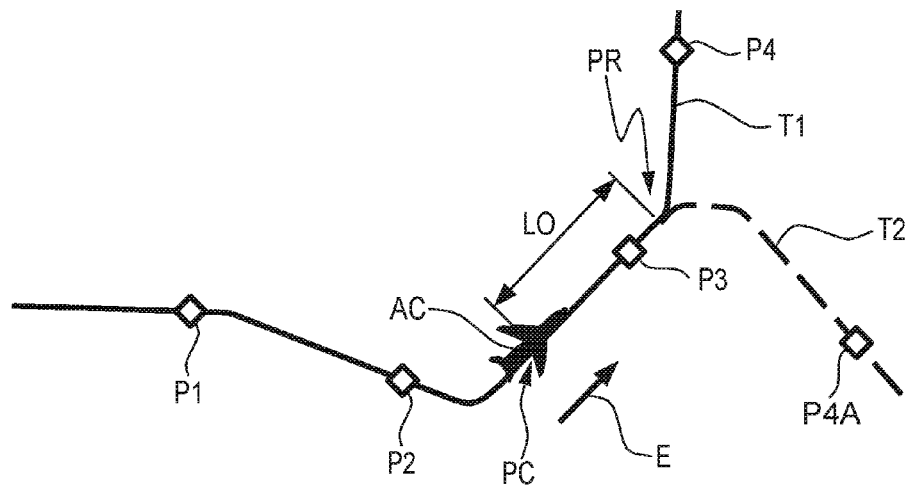
FIG. 2 shows a flight path of an aircraft from which a path change will be made.
Figure 3:
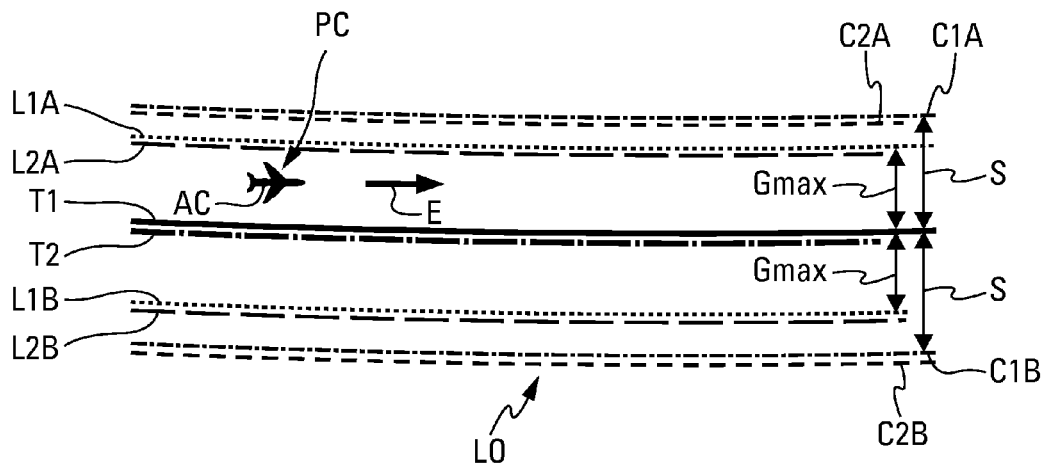
FIGS. 3 and 4 are diagrams showing a common portion of paths allowing features of the disclosure to be explained.
Figure 4:
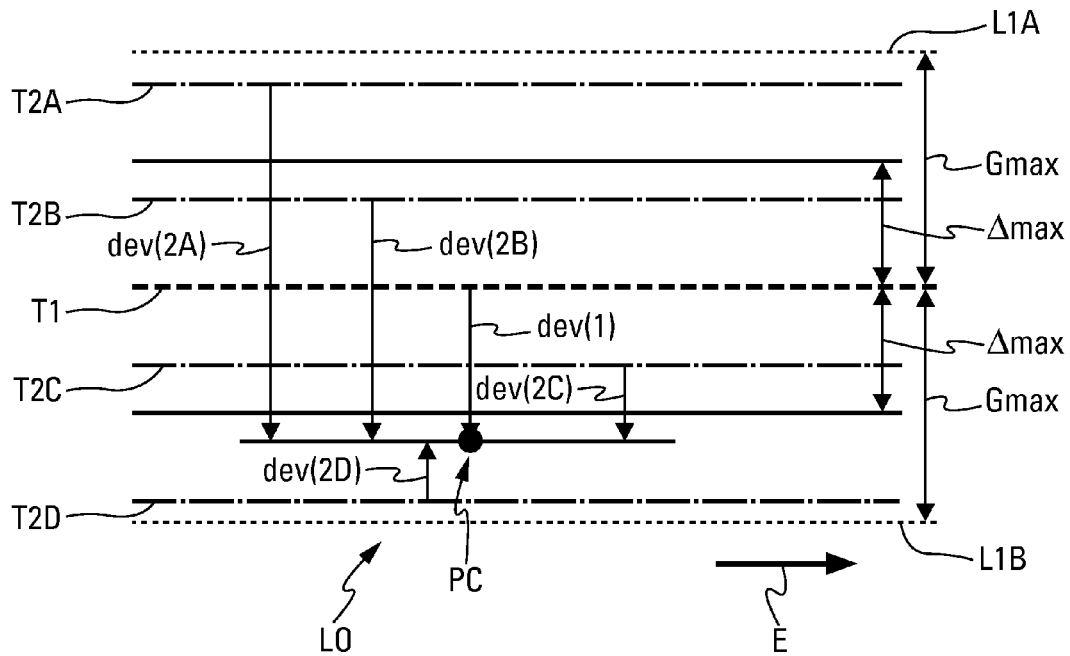

The calculation of the new flight path T2 (referred to as an auxiliary path) may last for some seconds (system calculation time). During this time period, the aircraft AC continues to fly along the current flight path T1, as shown in FIG. 2. In FIGS. 2 to 4, the direction of flight of the aircraft AC is indicated by an arrow E.

In the example in FIG. 2, the path T1 passes through successive waypoints P1, P2, P3 and P4 which are part of an initial flight plan. In addition, in this example, the new flight path (or auxiliary flight path) T2 departs from the flight path T1 at a point of divergence PR in order to join a waypoint P4A (for example entered by the pilot using the input unit 5), instead of the waypoint P4.

Conventionally, the pilot has a plurality of ways for modifying the path (adding or deleting one or more of the waypoints). This can be done, for example, using an input unit corresponding to a man-machine interface of the flight management calculator, or directly on a screen (for example of the navigation display (ND) type, that is to say a navigation screen) on which the lateral flight path is displayed. Before accepting the modification to the flight plan, the pilot generally checks, on the ND screen, the course of the lateral path (both the current and auxiliary path are displayed). If the new ("auxiliary") path is appropriate, the pilot inserts the new flight plan, thereby starting the calculation of the corresponding vertical path.

Moreover, during automatic low-altitude flight, the flight of the aircraft AC is secured within a corridor defined by a maximum distance S from the path to be followed, this corridor allowing there to be resistance to errors of different navigation and guidance systems of the aircraft AC. In the example in FIG. 3:
  the corridor associated with the current path T1 is delimited by two limits C1A and C1B (each having a distance S from T1, on either side of T1); and
  the corridor associated with the auxiliary path T2 is delimited by two limits C2A and C2B (each having a distance S from T2, on either side of T2).

In addition, when the aircraft AC departs too far from the path being followed and before it leaves the corresponding corridor, alerts are emitted which may lead to the current operation being interrupted. An alert is emitted when the distance of the position of the aircraft AC from the path T1, T2 exceeds a predetermined alert threshold Gmax.

This alert threshold Gmax allows an alert corridor to be defined. More particularly, in the example in FIG. 3:
  the alert corridor associated with the current path T1 is delimited by two limits L1A and L1B (each having a distance of value Gmax from T1, on either side of T1); and
  the alert corridor associated with the auxiliary path T2 is delimited by two limits L2A and L2B (each having a distance of value Gmax from T2, on either side of T2).

In order to secure the transition between the current path T1 and the auxiliary path T2, these paths T1 and T2 need to have a common part, referred to as the common portion LO.

In addition, before authorising the guidance on the new path T2, the device 1 verifies that the two paths T1 and T2 do indeed have such a common portion LO (which corresponds at least to the time of flight of the aircraft AC during the calculation of the new path T2).

In order to do this, according to the disclosure, the device 1, which is on board the aircraft AC, comprises, in addition to the above-mentioned calculators 2 and 4, as shown in FIG. 1:
  a central unit 10 which is configured to carry out a path comparison. In order to do this, this central unit 10 comprises:
    a calculation element 11 which is configured to automatically determine a deviation dev(1) corresponding to a deviation of the current position PC of the aircraft AC (received by a connection 12 of the position calculator 4) from the current path T1 (received by a connection 13 of the flight management calculator 2 and stored in the central unit 10);

a calculation element 14 which is configured to automatically determine a deviation dev(2) corresponding to a deviation of the current position PC of the aircraft AC (received by the connection 12 of the position calculator 4) from the auxiliary path T2 (received by the connection 13 of the flight management calculator 2 and stored in the central unit 10);

a calculation element 15 which is connected by connections 16 and 17, respectively, to the calculation elements 11 and 14 and which is configured to automatically calculate the difference between the deviation dev(1) and dev(2); and a calculation element 18 which is connected by a connection 19 to the calculation element 15, and which is configured to automatically compare the absolute value of this difference with a predetermined maximum allowed distance Δ(FIG. 4). A first condition C1 is considered to be met if the absolute value is less than or equal to the maximum allowed distance Δmax; and a path change unit 20 which is connected to a central unit 10 by a connection 9 and which is configured to automatically control a flight path change if at least the first condition C1 is considered to be met repeatedly over a predetermined time period t0.

A flight path change comprises replacing the current path T1 with the auxiliary path T2 in a manner such as to make the aircraft AC fly following the auxiliary path T2 from the change onwards. In order to do this, the path change unit 20, which may be part of the central unit 10 or of another element of a guidance system 22, carries out the necessary switches to change from T1 to T2.

In the present description:

dev(i) refers to a (lateral or vertical) deviation between the current position PC of the aircraft AC and a (lateral or vertical) flight path Ti of reference "i". It is considered, for example, that dev(i)>0 if the aircraft AC (that is to say its current position PC) is to the right of (in the flight direction E) or below the path and dev(i)<0 if the aircraft AC is to the left of or above the path. The lateral (or vertical) deviations are calculated by orthogonally projecting the current position PC of the aircraft AC onto the lateral (or vertical) path of the path in question of the aircraft AC;

Δmax is the maximum tolerated distance between the two paths T1 and T2, and corresponds for example to 50 meters; and Gmax is the alert threshold of the distance between the current position PC of the aircraft AC and the path T1, T2, and corresponds for example to 100 meters.

It will be noted that the auxiliary path becomes available as it is calculated, thereby allowing the current path and the auxiliary path (as soon as some of it is available) to be compared during the phase of calculating the auxiliary path. The calculation of the entire auxiliary path takes some time, but the calculation of a first part of this auxiliary path is available quite quickly and can thus be used to carry out the comparison and in particular to calculate the deviation dev(2).

In a preferred embodiment, the central unit 10 is part of a guidance calculator 21 of the aircraft AC.

The calculation elements 11 and 14 of the central unit 10 therefore determine a deviation dev(i) between the current position PC of the aircraft AC and a flight path T1, T2, by calculating the distance between this current position PC and an auxiliary point on the flight path corresponding the orthogonal projection of the current position PC on the flight path T1, T2.

Furthermore, within the context of the present disclosure, the calculation elements 11 and 14 determine and use:

deviations corresponding to lateral deviations from a lateral path (that is to say defined in the lateral or horizontal plane) of a flight path T1, T2; or deviations corresponding to vertical deviations from a vertical path (that is to say defined in the vertical plane) of a flight path T1, T2; or preferably, both deviations corresponding to lateral deviations and deviations corresponding to vertical deviations.

In this last (preferred) embodiment, all the processing and verifications (which are set out in the present description) are therefore carried out by the device 1 both in the vertical plane and the lateral (or horizontal) plane.

Thus, FIGS. 3 and 4 may correspond to corridors and distances which are defined either in the horizontal plane or the vertical plane.

The device 1 as described above therefore does not provide a comparison of the two paths T1 and T2 from point to point, but provides a comparison of the deviations dev(1) and dev(2) between the current position PC of the aircraft AC and the two paths T1 and T2 respectively. If the difference between these deviations is less than the absolute value of the maximum allowed distance Δmax during at least the time period to, a path change is allowed.

Preferably, the flight paths T1 and T2 are low-altitude flight paths, and the maximum allowed distance Δmax is less than the threshold Gmax (for triggering an alarm indicating excessive distance).

The device 1 thus allows a revision (or change) to the path even if the paths T1 and T2 are not strictly identical in the region of the common portion L0. A tolerance for small calculation errors is thus permitted.

More specifically:

if the two paths T1 and T2 do not have a common part or portion, or if the common portion is too short, the new path T2 cannot be actuated and the aircraft AC will continue to be guided following the current path T1;

however, if the two paths T1 and T2 have a common portion L0 of sufficient length, the new path T2 can be actuated and the aircraft AC will be guided following this new path T2.

In a preferred embodiment, the device 1 is part of a guidance system 22 of the aircraft AC. This guidance system 22 comprises at least the position calculator 4, the flight management system (FMS) 3 comprising at least a flight management calculator 2, and the guidance calculator 21 of the aircraft AC. In a particular embodiment, this guidance system 22 is configured, in a conventional manner, to automatically guide the aircraft AC during a low-altitude flight.

In addition, in a particular embodiment, a calculation element, for example the calculation element 18, also compares the absolute value of the deviation dev(1) (from the current path T1) with the predetermined threshold Gmax. A second condition C2 is considered to be met if the absolute value of the deviation dev(1) is less than or equal to the threshold Gmax. In this particular embodiment, the unit 20 makes a change to the flight path if, in addition to the above-mentioned first condition C1, this second condition C2 is also considered to be met repeatedly over the entire predetermined time period t0.

As a result, in this particular embodiment, so that the revision or the change to the path is allowed and carried out by the unit 20, it is necessary, during the predetermined time period t0 (for example 30 seconds, which may correspond, for an aircraft flying at low altitude, to approximately 4500 meters of the path), for the following conditions C1 and C2 to be met simultaneously, namely:

$$|dev(1)-dev(2)| \leq \Delta max \text{ and } |dev(1)| \leq Gmax$$

FIG. 4 shows different auxiliary paths T2A, T2B, T2C and T2D in connection with a current path T1 to show different possible cases of deviations and to allow the implementation of the disclosure to be well explained.

In this example, it is considered that dev(i)>0 if the aircraft AC (current position PC) is to the right of (in the flight direction E) or below the path Ti and dev(i)<0 if the aircraft AC is to the left of or above the path Ti. In FIG. 4, |dev(1)|≤Gmax (condition C2 is met).

More specifically, the examples in FIG. 4 are such that:

A/ for the paths T1 and T2A, dev(1)>0, dev(2A)>0 and |dev(1)−dev(2A)|>Δmax such that the path change from T1 to T2A is not allowed;

B/ for the paths T1 and T2B, dev(1)>0, dev(2B)>0 and |dev(1)−dev(2B)|≤Δmax such that the path change from T1 to T2B is allowed;

C/ for the paths T1 and T2C, dev(1)>0, dev(2C)>0 and |dev(1)−dev(2C)|≤Δmax such that the path change from T1 to T2C is allowed; and D/ for the paths T1 and T2D, dev(1)>0, dev(2D)<0 and |dev(1)−dev(2D)|>Δmax such that the path change from T1 to T2D is not allowed.

The invention claimed is:

1. A method for automatically managing a flight path change on an aircraft during a flight at low altitude, the flight path comprising at least one of a lateral path and a vertical path, the method comprising:
   a) automatically calculating, using a flight management calculator during the flight of the aircraft along a current flight path, a new flight path referred to as an auxiliary flight path;
   b) automatically carrying out, using a central unit, a path comparison by repeatedly implementing successive sub-steps over a predetermined time period, the sub-steps comprising:
      b1) determining, using a position calculator, a current position of the aircraft;
      b2) determining a first deviation corresponding to a deviation of the current position of the aircraft from the current flight path;
      b3) determining a second deviation corresponding to a deviation of the current position of the aircraft from the auxiliary flight path;
      b4) calculating a difference between the first and second deviations; and
      b5) comparing an absolute value of the difference with a predetermined maximum allowed distance, a first condition being considered to be met when the absolute value is less than or equal to the maximum allowed distance; and
   c) automatically making, using a path change unit, the flight path change if at least the first condition is considered to be met repeatedly over an entirety of the predetermined time period, the flight path change comprising replacing the current flight path with the auxiliary flight path in a manner such as to make the aircraft fly following the auxiliary flight path from the flight path change onwards.

2. The method according to claim 1, comprising:
   in step b), an absolute value of the first deviation is compared with a predetermined threshold, a second condition being considered to be met when the absolute value of the first deviation is less than or equal to the predetermined threshold; and,
   in step c), the flight path change is made if, in addition to the first condition, the second condition is also considered to be met repeatedly over the entirety of the predetermined time period.

3. The method according to claim 1, wherein the deviation of the current position of the aircraft from the flight path corresponds to a distance between the current position and an auxiliary point on the flight path, the auxiliary point corresponding to an orthogonal projection of the current position on the flight path.

4. The method according to claim 1, wherein step b) comprises determining and using deviations corresponding to lateral deviations from the lateral path of the flight path.

5. The method according to claim 1, wherein step b) comprises determining and using deviations corresponding to vertical deviations from the vertical path of the flight path.

6. The method according to claim 1, wherein the maximum allowed distance is less than a threshold for triggering an alarm indicating excessive distance.

7. The method according to claim 1, wherein the flight path is a low-altitude flight path.

8. A device for automatically managing a flight path change on an aircraft for a low-altitude flight, the device comprising:
   a flight management calculator configured to automatically calculate, during a flight of the aircraft along a current flight path, a new flight path referred to as an auxiliary flight path;
   a position calculator configured, by virtue of memory storing a computer program for execution by the position calculator, to automatically determine a current position of the aircraft;
   a central unit configured, by virtue of memory storing a computer program for execution by the central unit, to automatically carry out a path comparison, the central unit comprising calculation elements to automatically carry out a following set of operations:
      determining a first deviation corresponding to a deviation of the current position of the aircraft from the current flight path;
      determining a second deviation corresponding to a deviation of the current position of the aircraft from the auxiliary flight path;
      calculating a difference between the first and second deviations; and
      comparing an absolute value of the difference with a predetermined maximum allowed distance, a first condition being considered to be met when the absolute value is less than or equal to the maximum allowed distance; and
   a path change unit configured, by virtue of memory storing a computer program for execution by the path change unit, to automatically make the flight path change if at least the first condition is considered to be met repeatedly over a predetermined time period, the flight path change comprising replacing the current flight path with the auxiliary flight path in a manner such as to make the aircraft fly following the auxiliary flight path from the flight path change onwards.

9. The device according to claim 8, wherein the central unit is part of a guidance calculator.

10. The device according to claim 8, wherein the central unit is configured to compare an absolute value of the first deviation with a predetermined threshold, a second condition being considered to be met when the absolute value of the first deviation is less than or equal to the predetermined threshold; and wherein the path change unit is configured to make the flight path change if, in addition to the first condition, the second condition is also considered to be met repeatedly over an entirety of the predetermined time period.

11. A system for guiding an aircraft, the system comprising the device according to claim 8, wherein the system implements the device for automatically managing the flight path change on the aircraft.

12. An aircraft comprising the device according to claim 8, wherein the aircraft implements the device for automatically managing the flight path change on the aircraft.

13. An aircraft comprising a guidance system according to claim 11.

\* \* \* \* \*